(12) United States Patent
Schultz et al.

(10) Patent No.: US 11,949,927 B2
(45) Date of Patent: Apr. 2, 2024

(54) METHODS AND SYSTEMS FOR HYBRID AND CONCURRENT VIDEO DISTRIBUTION FOR HEALTHCARE CAMPUSES

(71) Applicant: Stryker Corporation, Kalamazoo, MI (US)

(72) Inventors: Andrew Schultz, San Diego, CA (US); Sean Victor Hastings, Flower Mound, TX (US)

(73) Assignee: Stryker Corporation, Kalamazoo, MI (US)

( * ) Notice: Subject to any disclaimer, the term of this patent is extended or adjusted under 35 U.S.C. 154(b) by 0 days.

(21) Appl. No.: 17/452,765

(22) Filed: Oct. 28, 2021

(65) Prior Publication Data
US 2022/0141508 A1 May 5, 2022

Related U.S. Application Data

(60) Provisional application No. 63/108,208, filed on Oct. 30, 2020.

(51) Int. Cl.
| | | |
|---|---|---|
| H04N 21/2343 | (2011.01) | |
| H04N 19/40 | (2014.01) | |
| H04N 21/61 | (2011.01) | |
| H04N 21/81 | (2011.01) | |

(52) U.S. Cl.
CPC ....... H04N 21/23439 (2013.01); H04N 19/40 (2014.11); H04N 21/6125 (2013.01); H04N 21/816 (2013.01)

(58) Field of Classification Search
CPC ............. H04N 21/23439; H04N 19/40; H04N 21/6125; H04N 21/816
See application file for complete search history.

(56) References Cited

U.S. PATENT DOCUMENTS

| | | | |
|---|---|---|---|
| 7,089,577 B1 * | 8/2006 | Rakib | H04N 21/435 725/100 |
| 7,191,462 B1 * | 3/2007 | Roman | H04N 21/25833 348/E7.071 |
| 8,594,139 B2 | 11/2013 | Yu et al. | |

(Continued)

FOREIGN PATENT DOCUMENTS

| | | |
|---|---|---|
| CN | 104768024 B | 1/2018 |
| WO | 2019065652 A1 | 4/2019 |

OTHER PUBLICATIONS

Castro et al. "SplitStream: High-Bandwidth Multicast in Cooperative Environments," ACM Symposium on Operating Systems Principles 2003, Oct. 19-22, 2003, Bolton Landing, New York, USA, pp. 1-16.

(Continued)

*Primary Examiner* — Fernando Alcon
(74) *Attorney, Agent, or Firm* — Morrison & Foerster LLP

(57) ABSTRACT

Disclosed are methods and systems that can transmit medical imaging data. These methods and systems can include generating a first video stream based on imaging data generated by an imaging device, wherein the first video stream comprises a first bitrate; generating a second video stream based on the imaging data, wherein the second video stream comprises a second bitrate lower than the first bitrate; transmitting the first video stream for consumption by a first device; and concurrently transmitting the second video stream for consumption by a second device.

28 Claims, 7 Drawing Sheets

(56) References Cited

U.S. PATENT DOCUMENTS

| | | | |
|---|---|---|---|
| 8,768,142 B1* | 7/2014 | Ju | H04N 1/00244 386/224 |
| 8,924,234 B2 | 12/2014 | Renzi et al. | |
| 8,964,830 B2 | 2/2015 | Perlman et al. | |
| 10,162,936 B2 | 12/2018 | Wasnik et al. | |
| 10,277,928 B1* | 4/2019 | Joliveau | G11B 27/10 |
| 2004/0045030 A1* | 3/2004 | Reynolds | H04N 21/6379 725/110 |
| 2004/0117786 A1* | 6/2004 | Kellerman | H04N 21/2408 348/E7.071 |
| 2004/0216163 A1* | 10/2004 | Whitcomb | H04N 21/2143 725/74 |
| 2007/0050828 A1* | 3/2007 | Renzi | H04N 7/163 348/E7.071 |
| 2007/0147804 A1 | 6/2007 | Zhang et al. | |
| 2009/0305790 A1* | 12/2009 | Lu | A63F 13/355 463/42 |
| 2010/0260348 A1* | 10/2010 | Bhow | H04N 21/25891 381/81 |
| 2011/0265134 A1 | 10/2011 | Jaggi et al. | |
| 2012/0007866 A1* | 1/2012 | Tahan | H04N 21/440245 345/428 |
| 2013/0088644 A1* | 4/2013 | Atkins | H04N 21/25825 348/602 |
| 2013/0166767 A1* | 6/2013 | Olivier | H04N 21/2143 709/231 |
| 2014/0096170 A1* | 4/2014 | Emerson | H04N 21/4223 725/98 |
| 2015/0074232 A1* | 3/2015 | Phillips | H04N 21/85406 709/219 |
| 2015/0304707 A1* | 10/2015 | Vadura | H04N 21/4135 725/25 |
| 2017/0070764 A1* | 3/2017 | Massoudi | H04N 21/42684 |
| 2018/0041891 A1* | 2/2018 | Bleyl | H04N 21/44224 |
| 2018/0167650 A1 | 6/2018 | Hutter et al. | |
| 2018/0376182 A1 | 12/2018 | Kojima et al. | |
| 2020/0014905 A1* | 1/2020 | Oh | H04N 19/46 |
| 2020/0162796 A1* | 5/2020 | Azuolas | H04N 21/4312 |
| 2020/0382823 A1* | 12/2020 | Shiota | H04N 21/4316 |
| 2021/0336939 A1* | 10/2021 | Wiener | H04L 61/5007 |
| 2022/0060673 A1* | 2/2022 | Daniali | H04N 19/597 |

OTHER PUBLICATIONS

Extended European Search Report dated Mar. 14, 2022, directed to EP Application No. 21205558.6; 9 pages.

Fouladi et al. "Salsify: Low-Latency Network Video through Tighter Integration between a Video Codec and a Transport Protocol" 15th USENIX Symposium on Networked Systems Design and Implementation (NSDI '18), Apr. 9-11, 2018, Renton, WA, USA, pp. 1-17.

* cited by examiner

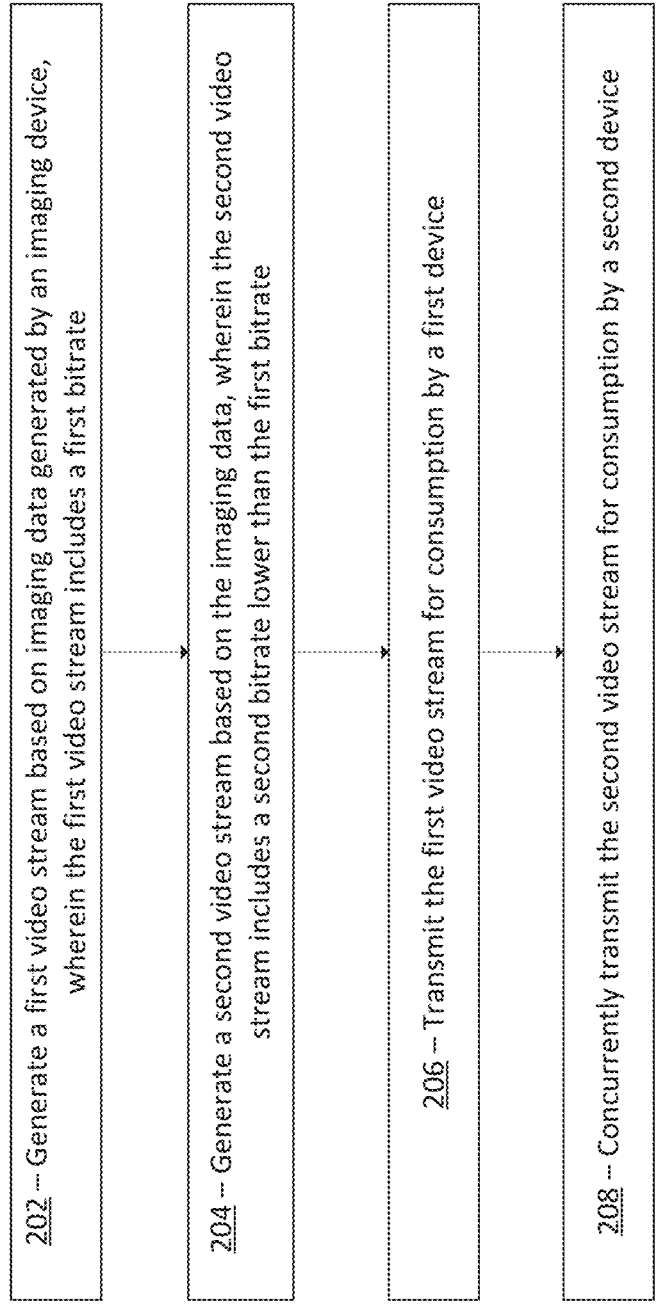

METHODS AND SYSTEMS FOR HYBRID AND CONCURRENT VIDEO DISTRIBUTION FOR HEALTHCARE CAMPUSES

CROSS-REFERENCE TO RELATED APPLICATIONS

This application claims the benefit of U.S. Provisional Application No. 63/108,208, filed Oct. 30, 2020, the entire contents of which are hereby incorporated by reference herein.

FIELD

The present disclosure relates generally to medical imaging methods and systems, more particularly to methods and systems of processing and transmitting medical images in healthcare environments.

BACKGROUND

Institutional healthcare environments (i.e., campuses), specifically operating rooms or theaters in these healthcare environments, have started to move away from traditional video signal standards for video transmission and distribution toward internet protocol ("IP") based technology. Video sources can be packetized and transmitted over high bandwidth data networks rather than matrix switches and routers.

In operating room environments where the video can be used to perform medical procedures (e.g., endoscopic procedures), video quality can be of utmost importance. Due to this high priority to video quality, technologies can be employed for this market that are not typically used in the commercial broadcast industry. For example, video for medical purposes may be uncompressed or employ minimal compression to ensure video quality and accurate reproduction for healthcare providers to conduct and perform various medical procedures. Uncompressed or lightly compressed IP video can require high bandwidth data networks for transmission. In order to support the transmission of uncompressed or lightly compressed IP video and because of the high incremental cost, high bandwidth private data networks can be employed in confined areas of the healthcare campus like operating rooms, but not pervasively throughout the entire institution or campus (e.g., a hospital). It is not unusual for these private networks to be bridged to institutional or campus networks that utilize lower bandwidth network links.

SUMMARY

According to an aspect, systems and methods can utilize transmission of concurrent or simultaneous video streams: one of uncompressed, or slightly compressed quality, and a second of more, or highly, compressed quality. In some aspects, these systems and methods can allow high quality, high bandwidth video to be distributed over a high bandwidth private data network (within an operating room for example), and then routing of the highly compressed IP video stream across a lower bandwidth (institutional/campus) network. The compressed IP video stream can be used for video conferencing, remote observation, recording, or a variety of other uses where high quality is not a top priority. In contrast, the uncompressed or slightly compressed video can maintain its high quality within the private network in order to maintain the high quality for its purposes (e.g., medical procedure within an operating room). In some examples, herein "slightly compressed" can mean compressed by less than 50%, compressed by less than 40%, compressed by less than 30%, compressed by less than 20%, compressed by less than 10%, or compressed by less than 5%.

According to an aspect, the uncompressed or slightly compressed video for healthcare environments can be often proprietary or closed system technologies. As such, adding the ability of IP video encoders/decoders (e.g., IP codecs) to produce/consume industry standard compressed video streams can provide interoperability between proprietary and standards-based technologies and products that a healthcare institution/campus may already be utilizing.

According to an aspect, a method of transmitting medical imaging data includes generating a first video stream based on imaging data generated by an imaging device, wherein the first video stream comprises a first bitrate; generating a second video stream based on the imaging data, wherein the second video stream comprises a second bitrate lower than the first bitrate; transmitting the first video stream for consumption by a first device; and concurrently transmitting the second video stream for consumption by a second device.

Optionally, generating the second video stream comprises encoding the medical imaging data for transmission over an internet protocol network.

Optionally, the method includes receiving the medical imaging data at an encoding device, wherein the encoding device generates and concurrently transmits the first video stream and the second video stream.

Optionally, the imaging device is configured to generate the first video stream and the second video stream.

Optionally, the first video stream is generated by the imaging device and the second video stream is generated by an encoding device. Optionally, the encoding device receives the first video stream and generates the second video stream based on the first video stream. Optionally, the first and second video streams are concurrently transmitted to a network switch. Optionally, the first and second video streams are concurrently transmitted over the same transmission line.

Optionally, the first video stream is generated by the imaging device and the second video stream is generated by a transcoder.

Optionally, the first video stream is generated by an encoding device and the second video stream is generated by a transcoder. Optionally, the transcoder receives the first video stream and generates the second video stream based on the first video stream. Optionally, the first video stream is transmitted to a network switch and then to the transcoder.

Optionally, the first video stream is transmitted within a first network and the second video stream is transmitted to a second network.

Optionally, the first device is in a first room in which the medical imaging data is generated and the second device is in a second room different than the first room.

Optionally, the first device comprises a first display and the second device comprises a second display. Optionally, the first device and second device are configured to consume the first and/or second video stream. Optionally, the second device comprises a remote storage medium.

Optionally, the imaging data comprises endoscopic imaging data. The endoscope can have been inserted in a surgical cavity prior to starting the method for transmitting medical imaging data.

Optionally, wherein the imaging data is generated during a medical procedure and the first and second video streams are transmitted during the medical procedure. The medical procedure can be a non-invasive procedure. The imaging data can relate to external tissue of the patient, such as skin. Alternatively, the imaging data can relate to tissue underneath the skin imaged through the intact skin. Alternatively, the imaging data can relate to pre-exposed tissue inside the patient. Some examples of the methods disclosed herein do not encompass the step of exposing internal tissue of the patient.

Optionally, the first video stream comprises non-image data.

Optionally, the non-image data comprises at least one of sensor data, overlays, user input and control signals, or audio data.

Optionally, the second bitrate is at most 100 megabits per second. Optionally, the first bitrate is at least 1 gigabit per second.

Optionally, the method includes receiving the first video stream at a decoding device and transmitting the first video stream from the decoding device to the first device; receiving a third video stream at the decoding device, wherein the third video stream comprises a third bitrate lower than the first bitrate; and transmitting the third video stream for consumption by the first device.

According to an aspect, a system for transmitting medical imaging data includes one or more processors, wherein the one or more processors are configured to: generate a first video stream based on imaging data generated by an imaging device, wherein the first video stream comprises a first bitrate; generate a second video stream based on the imaging data, wherein the second video stream comprises a second bitrate lower than the first bitrate; transmit the first video stream for consumption by a first device; and concurrently transmit the second video stream for consumption by a second device.

Optionally, the system comprises an encoding device that comprises the one or more processors, and the encoding device is configured to concurrently transmit the first video stream and the second video stream to a first network switch.

Optionally, the system includes a first network switch, wherein the first network switch is configured to receive the first video stream and the second video stream, and wherein the first network switch is configured to concurrently transmit the first video stream within a first network and the second video stream to a second network.

Optionally, the system includes a decoding device, wherein the decoding device is configured to receive the first video stream and transmit the first video stream for consumption by the first device and receive a third video stream comprising a third bitrate lower than the first bitrate and transmit the third video stream for consumption by the first device.

Optionally, the system is configured for receiving the medical imaging data at an encoding device, wherein the encoding device generates and concurrently transmits the first video stream and the second video stream.

Optionally, the imaging device is configured to generate the first video stream and the second video stream.

Optionally, the first video stream is generated by the imaging device and the second video stream is generated by an encoding device. Optionally, the encoding device receives the first video stream and generates the second video stream based on the first video stream. Optionally, the first and second video streams are concurrently transmitted to a network switch. Optionally, the first and second video streams are concurrently transmitted over the same transmission line.

Optionally, the first video stream is generated by the imaging device and the second video stream is generated by a transcoder.

Optionally, the first video stream is generated by an encoding device and the second video stream is generated by a transcoder. Optionally, the transcoder receives the first video stream and generates the second video stream based on the first video stream. Optionally, the first video stream is transmitted to a network switch and then to the transcoder.

Optionally, the first video stream is transmitted within a first network and the second video stream is transmitted to a second network.

Optionally, the first device is in a first room in which the medical imaging data is generated and the second device is in a second room different than the first room.

Optionally, the first device comprises a first display and the second device comprises a second display Optionally, the first device and second device are configured to consume the first and/or second video stream. Optionally, the second device comprises a remote storage medium.

Optionally, the imaging data comprises endoscopic imaging data. Optionally, the imaging data is generated during a medical procedure and the first and second video streams are transmitted during the medical procedure.

Optionally, the first video stream comprises non-image data.

Optionally, the non-image data comprises at least one of sensor data, overlays, user input and control signals, or audio data.

Optionally, the second bitrate is at most 100 megabits per second. Optionally, the first bitrate is at least 1 gigabit per second.

It will be appreciated that any of the variations, aspects, features and options described in view of the systems apply equally to the methods and vice versa. It will also be clear that any one or more of the above variations, aspects, features and options can be combined.

Additional advantages will be readily apparent to those skilled in the art from the following detailed description. The aspects and descriptions herein are to be regarded as illustrative in nature and not restrictive.

All publications, including patent documents, scientific articles and databases, referred to in this application are incorporated by reference in their entirety for all purposes to the same extent as if each individual publication were individually incorporated by reference. If a definition set forth herein is contrary to or otherwise inconsistent with a definition set forth in the patents, applications, published applications and other publications that are herein incorporated by reference, the definition set forth herein prevails over the definition that is incorporated herein by reference.

BRIEF DESCRIPTION OF THE FIGURES

Exemplary aspects are described with reference to the accompanying figures, in which:

FIG. 2 depicts a flowchart representing an exemplary method for transmitting imaging data, in accordance with some aspects.

In the Figures, like reference numerals refer to like components unless otherwise stated.

DETAILED DESCRIPTION

Reference will now be made in detail to implementations of various aspects and variations of systems and methods described herein. Although several exemplary variations of the systems and methods are described herein, other variations of the systems and methods may include aspects of the systems and methods described herein combined in any suitable manner having combinations of all or some of the aspects described.

Disclosed herein are systems, methods, computer program products, computer readable mediums, and techniques that may address one or more of the needs discussed above. Described herein are exemplary aspects of a system for combining disparate compression streams in healthcare environments, which may address the problems and shortcomings of known systems and methods described above.

Figure 1:
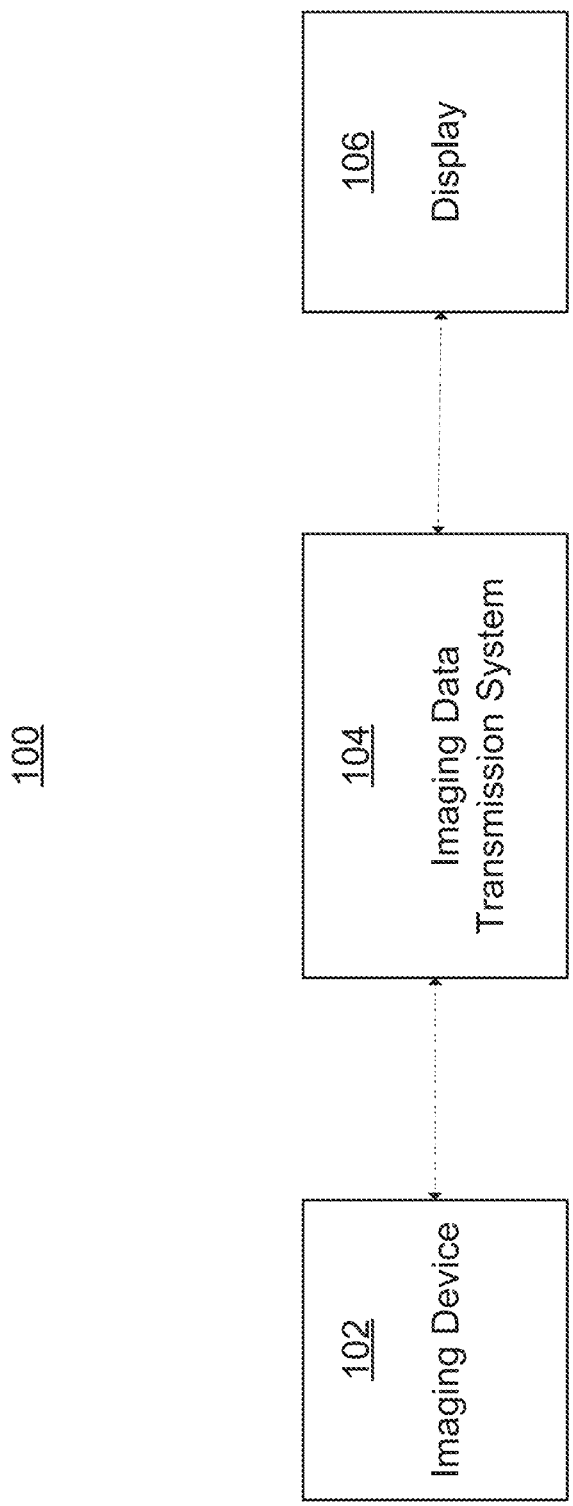
FIG. 1 depicts a system for transmitting imaging data, in accordance with some aspects.

FIG. 1 depicts an example of a system 100 for transmitting medical imaging data, in accordance with some aspects.

As shown in FIG. 1, system 100 may include imaging device 102, imaging data transmission system 104, and display 106. Each of these components may be communicatively coupled with one another such that they may send and receive electronic information via network communication amongst one another. As shown in the example of FIG. 1, data transmission system 104 may be communicatively coupled to both imaging device 102 and to display 106.

In this example, imaging device 102 may be any electronic source for medical or surgical images and/or video, such as an image capture device, a video capture device, a diagnostic imaging system, an image-capture, picture archiving and communications system (PACS), vendor neutral archive (VNA), image/video archive, and/or video-capture endoscope, an image or video broadcasting or relaying device, one or more servers, and/or one or more databases or repositories. Imaging device 102 may be configured to transmit image data (e.g., monitoring/medical/surgical image data and/or monitoring/medical/surgical video data) to data transmission system 104 by any wired or wireless electronic communication medium, including by any suitable network communication protocol. In some aspects, imaging device 102 may not be an imaging device or may include a non-image device as well as an imaging device. As such, imaging device 102 can be a device that can transmit non-image data such as sensor data, overlays, user input and control signals, audio data, etc.

In this example, data transmission system 104 may be any device or system comprising one or more computer processors configured to receive image data, transmit and/or process the received image data, and to generate and transmit one or more output signals in accordance with the results of the image processing and/or assessment. Data transmission system 104 may be provided, in whole or in part, as all or part of a desktop computing device, laptop, tablet, mobile electronic device, dedicated medical image processing device, computing module, processor, server, cloud computing system, distributed computing system, or the like. Data transmission system 104 may be provided locally with respect to imaging device 102 and/or display 106 (e.g., in the operating room (e.g., surgical suite) or other hospital room), while alternatively data transmission system 104 may be provided remotely from imaging device 102 and/or display 106 (e.g., outside the surgical suite, elsewhere in a hospital, at a remote server location, etc.). Also, portions of data transmission system 104 may be provided locally and portions of data transmission system 104 may be provided remotely from imaging device 102 and/or display 106 (e.g., a portion in the operating room and a portion outside the operating room).

In some aspects, data transmission system 104 may be configured to receive image data (e.g., image and/or video data showing an image or frame of video) from imaging device 102 and to modify the image data to encode/decode or compress/decompress the image data. Data transmission system 104 may be configured to transmit medical imaging data in accordance with the techniques discussed below with reference to FIG. 2. The image data may be in the form of a still image, one or more frames of a video image, or a video stream/feed. The image data may be received from an image or video capture device, an image or video broadcasting or relaying device, one or more servers, and/or one or more databases or repositories. The image data received may be in any suitable form of electronic communication, including wired and/or wireless network communication.

In some aspects, data transmission system 104 may be configured to encode/decode or not manipulate imaging data from the imaging device and concurrently transmit the imaging data that has been encoded, decoded, and/or not manipulated to one or more devices (e.g., displays or memories) to consume. Display 106 may be any type of device that can display imaging data, or the like. Optionally, the display can be controlled or limited in accordance with an instruction received from the data transmission system 104. Display 106 may be wholly hardware, wholly software, or may comprise both hardware and software. Display 106 may be a physical device, such as a display monitor. In some aspects, display 106 may not be a video display, but a storage medium. Data transmission system 104 may be a software component, such as image processing software configured to process one or more images (including, for example, the images received from imaging device 102) to transmit medical imaging data.

FIG. 2 depicts a flowchart representing an exemplary method 200 for transmitting image data. As described below in detail, method 200 may enable a data transmission system to generate a first video stream based on imaging data generated by an imaging device, wherein the first video stream includes a first bitrate; generate a second video stream based on the imaging data, wherein the second video stream includes a second bitrate lower than the first bitrate; transmit the first video stream for consumption by a first device; and/or concurrently transmit the second video stream for consumption by a second device.

Method 200 may be carried out, in whole or in part, by one or more of the components of a system for transmitting medical imaging data, such as system 100 described above with respect to FIG. 1. Any one or more of the aspects of method 200 may be combined, in whole or in part, with any one or more of the aspects of FIG. 1, and/or with any one or more of the systems, methods, devices, and/or techniques described elsewhere herein.

At block 202 the system can generate at least one first video stream based on imaging data generated by at least one imaging device, wherein the at least one first video stream includes a first bitrate. For example, the imaging data can include endoscopic imaging data and/or non-image data (e.g., sensory data, overlays, etc.). Preferably, the first bitrate is at least 1 gigabit per second.

In this example, the at least one imaging device is configured to generate the at least one first video stream at the first bitrate. Here, the system includes at least one IP encoder (or an IP codec) that can receive the imaging data generated by the at least one imaging device. The at least one IP encoder can generate the at least one first video stream having the first bitrate. In this example, the at least one first video stream generated by the at least one IP encoder has a bitrate the same or slightly lower than the video stream generated by the at least one imaging device. The at least one first video stream having the same first bitrate or a bitrate slightly lower than the video stream generated by the at least one imaging device can be considered an uncompressed video stream or a slightly compressed video stream when compared to the video stream generated by the at least one imaging device. In some aspects, the at least one imaging device can include at least one encoder. As such, the encoder can be a part of or incorporated in the imaging device.

At block 204, in this example, the system generates at least one second video stream based on the imaging data, wherein the at least one second video stream includes a second bitrate lower than the first bitrate. For example, the second bitrate is at most 100 megabits per second, e.g. the second bitrate is at most 1 gigabit per second. In some aspects, the at least one imaging device is configured to generate the at least one second video stream at the second bitrate. In some aspects, the at least one IP encoder (or IP codec) can generate the at least one second video stream having the second bitrate. The at least one IP encoder can encode or compress the at least one second video stream, thereby decreasing the bitrate of the at least one second video stream. As such, generating the at least one second video stream can include encoding or compressing the imaging data. In this example, the at least one second video stream generated by the at least one IP encoder has a bitrate lower than the video stream generated by the at least one imaging device. The at least one second video stream having the lower bitrate than the video stream generated by the at least one imaging device can be considered a compressed video stream when compared to the video stream generated by the at least one imaging device.

In some aspects, the at least one first video stream can be generated by the at least one first device (e.g., an imaging device) and the at least one second video stream can be generated by at least one second device (e.g., an IP encoder or IP codec). The at least one second device (e.g., an IP encoder or IP codec) can receive the at least one first video stream and generate the at least one second video stream based on the at least one first video stream. In some aspects, the at least one first video stream can be generated by an imaging device or can be generated by an IP encoder or IP codec and the at least one second video stream can be generated by a transcoder as shown in FIG. 3B. The transcoder can act as a bridge to the institutional or campus network. As such, the transcoder can be at the edge of a private network and can convert the at least one first video stream to the at least one second video stream with a lower bandwidth for transmission over the institutional/campus network (i.e., low bandwidth network).

At block 206, in this example, the system transmits the at least one first video stream for consumption by at least one first device. The at least one IP decoder (or IP codec) can receive the at least one first video stream for transmission to the at least one first device. The at least one IP decoder can decode or decompress the at least one first video stream, thereby increasing the bitrate of the at least one first video stream.

At block 208, in this example, the system concurrently transmits the at least one second video stream for consumption by at least one second device. The at least one IP decoder (or IP codec) can receive the at least one second video stream for transmission to the at least one second device. The at least one IP decoder can decode or decompress the at least one second video stream, thereby increasing the bitrate of the at least one second video stream. In some aspects, the at least one first device and/or the at least one second device can include at least one IP decoder. As such, the IP decoder can be incorporated into the first and/or second device (e.g., display).

In this example, the transmission of the at least one first and second video streams can be over an internet protocol ("IP") network. The at least one IP encoder (i.e., encoding device) can concurrently transmit the at least one first video stream and the at least one second video stream. The at least one IP encoder (or IP codec) can receive the imaging data and generate and concurrently transmit the at least one first video stream and the at least one second video stream. In some aspects, at least one decoding device can receive at least one third video stream, wherein the at least one third video stream has a third bitrate lower than the first bitrate. The at least one decoder can decode/decompress the at least one third video and transmit the at least one third video stream to the at least one first device for consumption. In some aspects, the at least one first device may not consume two video streams simultaneously. Instead, in some aspects, the at least one first device can consume the first or third stream individually. In some aspects, the at least one third video stream can be generated by the at least one imaging device, at least one encoder, or at least one IP camera as explained below with respect to FIG. 4.

In some aspects, the at least one first device and/or the at least one second device can include a display (for viewing the video stream(s)). The at least one first device can include at least one first display and the at least one second device can include at least one second display. The at least one first and/or second device can include at least one remote storage medium. The at least one first device can be in at least one first room (e.g., an operating room) in which the medical imaging data is generated and the at least one second device can be in at least one second room different than the at least one first room. For example, an endoscopic procedure may be underway in the first room. An endoscope may have already been inserted into a cavity in the patient. A medical professional may use the first device to see exactly what the endoscope is imaging inside the patient. The second room can be another room in a healthcare setting or a classroom where others are watching or learning from the medical procedure. In addition, the video from the endoscopic procedure may simply be sent to a remote storage medium in a second room for safekeeping.

The imaging data can be generated during a medical procedure and the at least one first and second video streams are transmitted during the medical procedure. In some aspects, the at least one first and second video streams are concurrently transmitted over the same transmission line.

In some aspects, the system can include at least one IP network. An IP network can be a communication network that uses internet protocol to send and receive messages between one or more devices. The at least one IP network can be a private network (e.g., operating room network) or a public network or larger private network (e.g., institutional or campus network). The at least one IP network can be a high bandwidth IP network or a low bandwidth IP network. A high bandwidth IP network can be at least a 10 Gb Ethernet network, at least a 20 Gb Ethernet network, at least a 25 Gb Ethernet network, at least a 40 Gb Ethernet network, or at least a 100 Gb Ethernet network. The high bandwidth IP network can be a private network. The network can be private because control over bandwidth utilization can reduce, control, or eliminate other network traffic that could potentially be intrusive to the distribution of video streams being utilized for medical procedures. The institutional or campus IP network may not want a video stream consuming the entire bandwidth of their network, or even a large portion of it, and therefore the video stream may need to be bandwidth limited. In some aspects, the low bandwidth IP network can be at most a 10 Gb Ethernet network, or at most a 1 Gb Ethernet network. In some aspects, the at least one first video stream can be transmitted within at least one first network and the at least one second video stream can be transmitted to at least one second network.

In some aspects, the at least one first and second video streams can be concurrently transmitted to a network switch (e.g., from at least one IP encoder and/or imaging device). A network switch can be a piece of networking hardware that connects devices on a computer network by using packet switching to receive and/or forward data to destination devices. In some aspects, the at least one first and second video streams can be transmitted or concurrently transmitted from the network switch to the at least one first or second device for consumption. In some aspects, the at least one first and second video streams can be transmitted or concurrently transmitted from the network switch to the at least one IP decoder and then to their respective devices (i.e., at least one first or second device). In some aspects, the at least one first video stream can be transmitted from the network switch to the at least one first IP decoder and the at least one second video stream can be transmitted from the network switch to the at least one second IP decoder. In some aspects, the at least one first IP decoder can decode (i.e., decompress) the at least one first video stream and transmit it to the at least one first device, and the at least one second IP decoder can decode the at least one second video stream and transmit it to the at least one second device. In some aspects, the at least one first IP decoder can be in the at least one first network and the at least one second IP decoder can be in the at least one second network. In some aspects, the network switch can be in a private and/or public IP network. The network switch can be in a high bandwidth and/or low bandwidth IP network.

In some aspects, the network switch can be configured to receive the at least one first and second video streams and concurrently transmit the at least one first video stream within the at least one first network and the at least one second video stream to the at least one second network. In some aspects, a network switch in a first network can be configured to receive the at least one first and second video stream sand transmit the at least one first and/or second video streams to a second network switch in a second network. In some aspects, the second network switch can transmit the at least one first and/or second video streams to a third network switch in a third network.

Figure 3A:
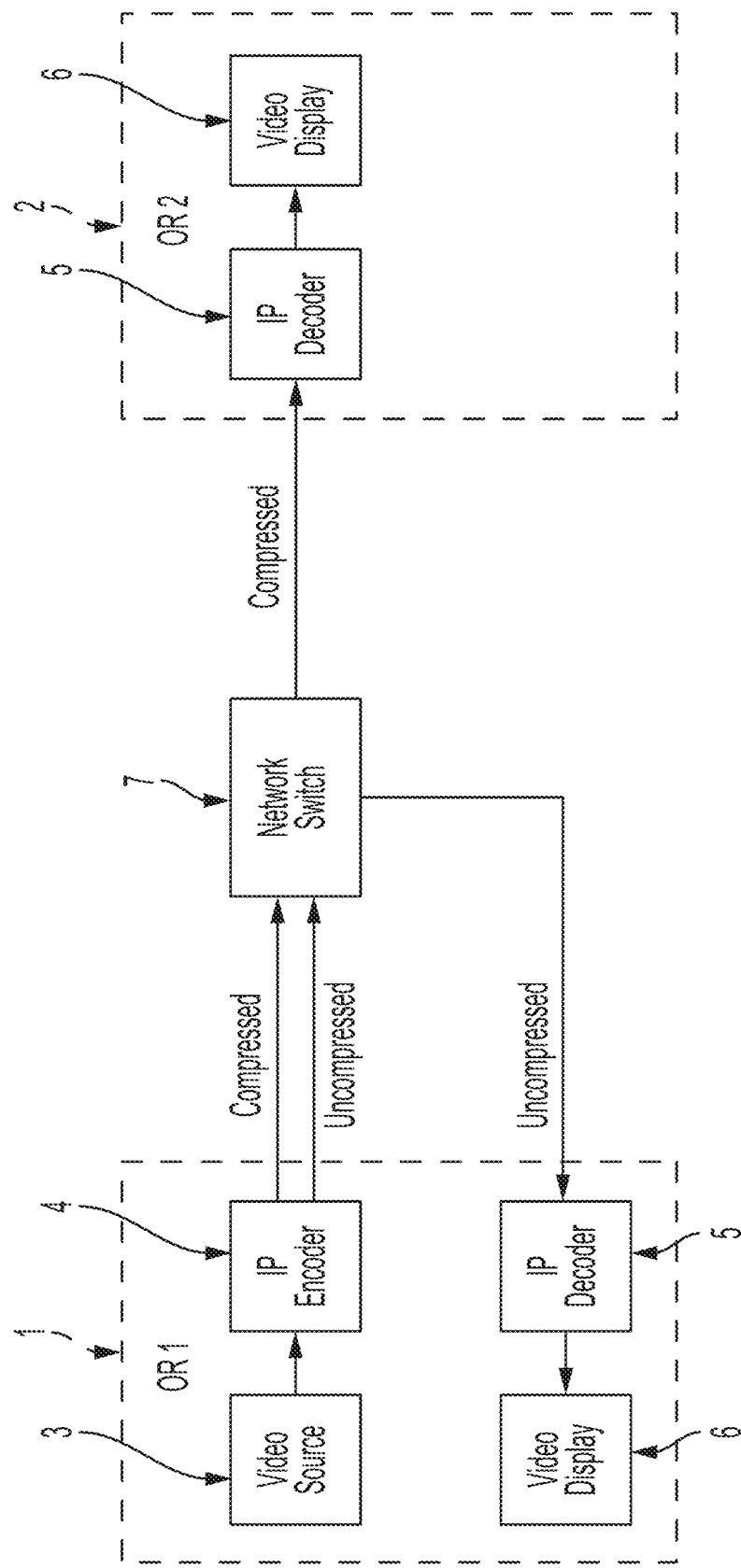
FIG. 3A depicts a first exemplary network diagram for transmitting imaging data, in accordance with some aspects.
Figure 3B:
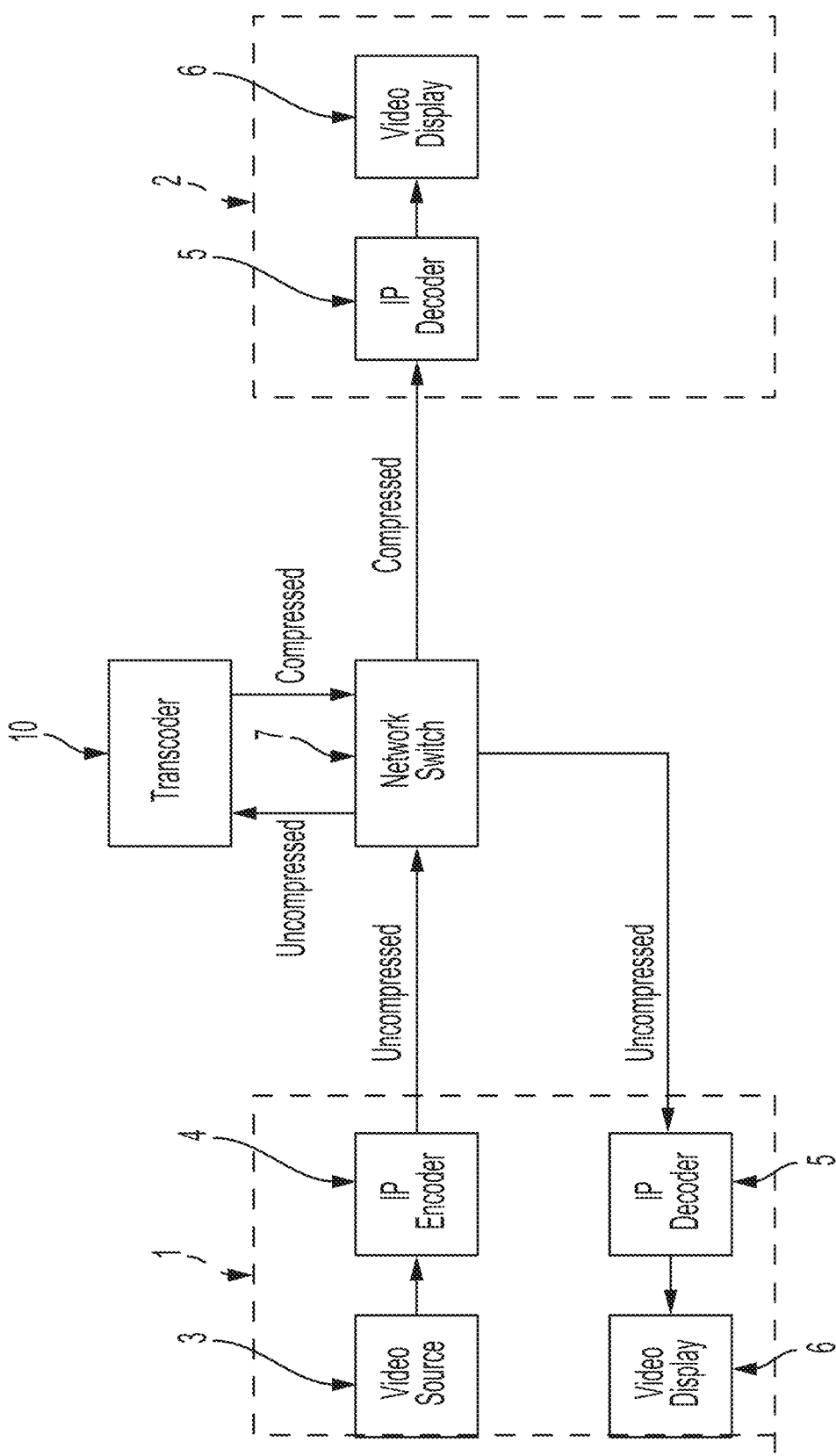
FIG. 3B depicts an alternative exemplary network diagram for transmitting imaging data, in accordance with some aspects.
Figure 4:
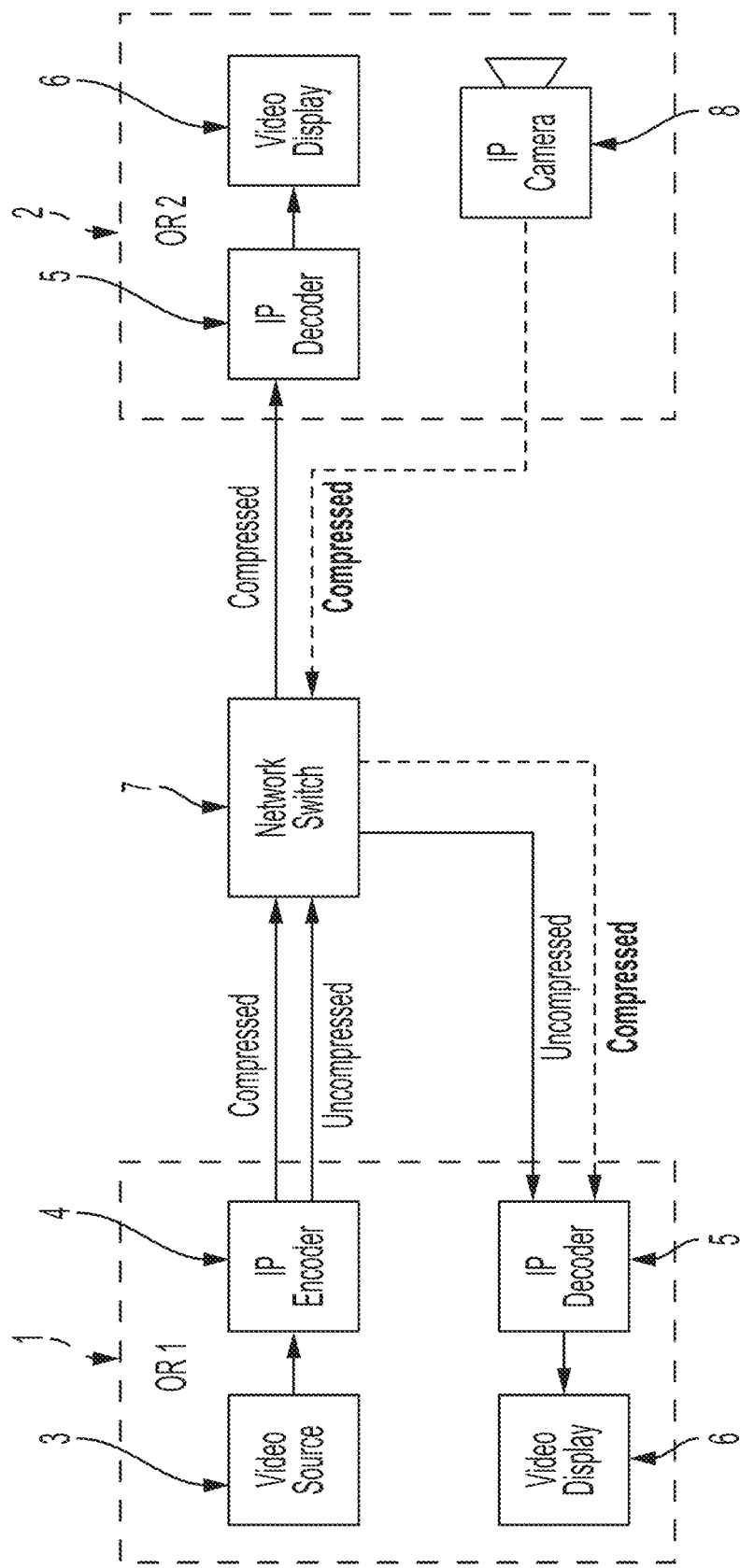
FIG. 4 depicts a second exemplary network diagram for transmitting imaging data, in accordance with some aspects.
Figure 5:
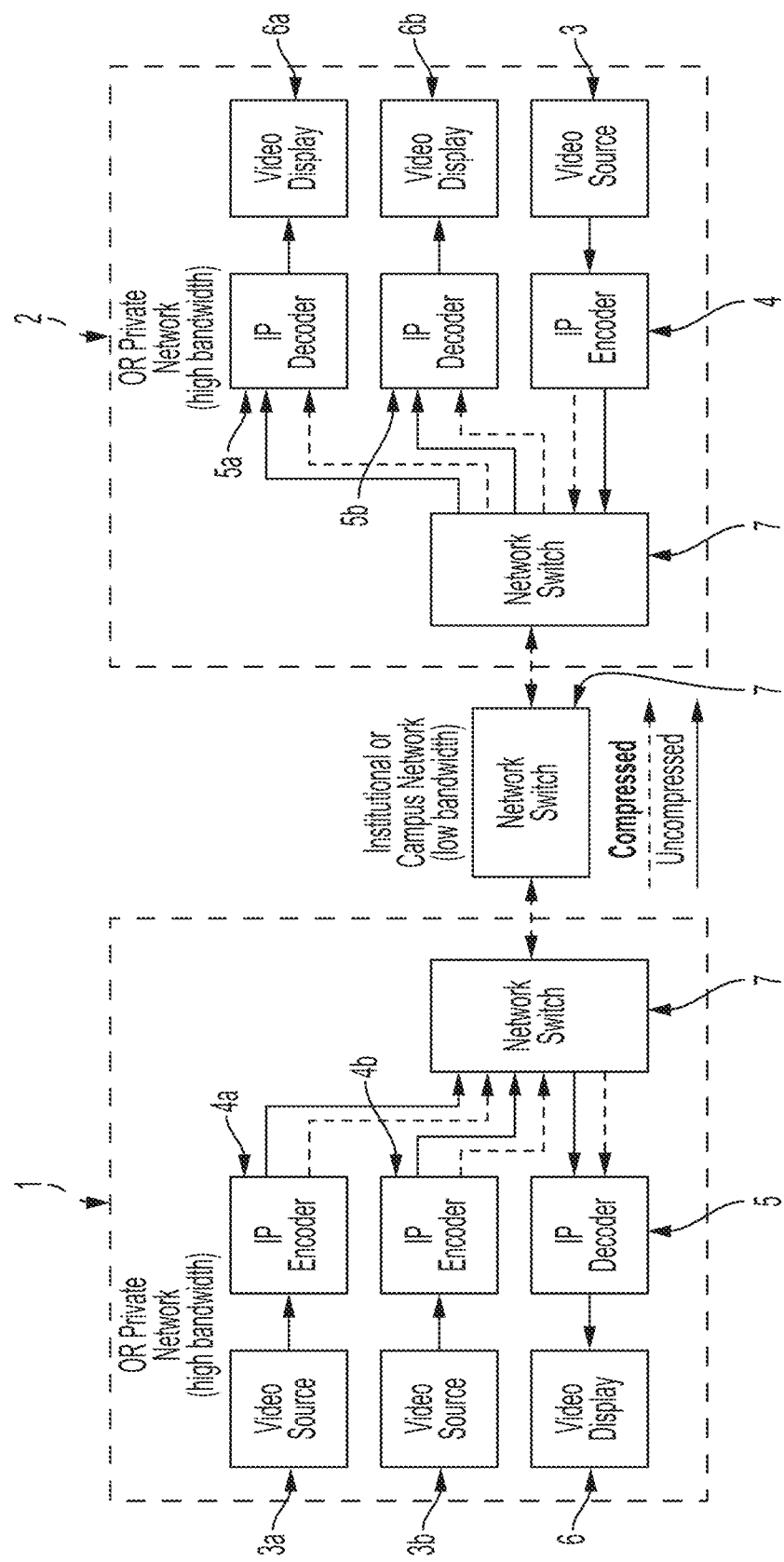
FIG. 5 depicts a third exemplary network diagram for transmitting imaging data, in accordance with some aspects.

FIGS. 3, 4, and 5 provide examples of various IP network diagrams in accordance with aspects disclosed herein. FIGS. 3, 4, and 5 include private IP network 1 and private IP network 2 separate from private network 1. The private networks can be a private network for a room in a healthcare environment such as an operating room. In some aspects, the private network can be a physically constrained network. In some aspects, the private network is a virtualized network. In some aspects, the private network is a virtual local area network. In addition, the private networks can be high bandwidth IP private networks. Within the room (e.g., operating room), there can be an imaging device, such as imaging device 3 in FIGS. 3, 4, and 5. A room can include more than one imaging device (e.g., imaging devices 3 and 3a) as shown in FIG. 5.

At least one imaging device 3 can be communicatively connected to at least one IP encoder 4. The at least one IP encoder can encode or compress the imaging data generated by the at least one imaging device. In some aspects, the at least one imaging device 3 can generate the first video stream. In some aspects, the at least one IP encoder 4 can generate the first video stream. In aspects where there are more than one imaging device and/or more than one IP encoder, more than one first video stream can be generated as shown in FIG. 5, for example.

In some aspects, the at least one IP encoder 4 can generate the second video stream with a second bitrate lower than the first bitrate. In aspects where there are more than one imaging device and/or more than one IP encoder, more than one second video stream can be generated as shown in FIG. 5, for example. The first video stream can be uncompressed or slightly compressed and the second video stream can be compressed (i.e., have a lower bitrate than the first video stream).

The at least one IP encoder 4 can be communicatively coupled to network switch 7. Network switch 7 can be in the private IP network as shown in FIG. 5 and/or can be in a public or institutional/campus IP network as shown in FIGS. 3, 4, and 5. In some aspects, network switch 7 can be communicatively coupled between two or more private IP networks. In some aspects, one network switch can be communicatively coupled to a second network switch as shown in FIG. 5.

Both the first video stream and the second video stream can be concurrently transmitted to network switch 7. Network switch 7 can be communicatively coupled to at least one IP decoder 5. As such, imaging data can be transmitted from the at least one imaging device to the at least one IP encoder to the at least one network switch to the at least one IP decoder. The at least one IP decoder can decode or decompress the imaging data from the network switch 7. As shown in FIGS. 3, 4, and 5, the private networks 1 and 2 can each have their own at least one IP decoder 5 (or 5a, 5b, etc.).

The at least one IP decoder can be communicatively coupled to at least one first device and/or at least one second device for consumption of the imaging data (e.g., video stream one and/or video stream two). The first and/or second device can be a display for displaying the video streams.

The following is one example of how the network diagram of FIG. 3A can function during a medical procedure. A medical professional can be performing an endoscopic procedure, for example, in an operating room that includes private IP network 1 (e.g., high bandwidth network). At the same time, a group of medical students may be observing the medical procedure or a recording of the medical procedure may be stored in a second room having its own IP network 2 (e.g., high bandwidth network). Because the medical professional needs to be able to see the endoscope video in high quality to be able to perform the procedure, the imaging data from the imaging device 3 may not be compressed or may be slightly compressed. This first video stream can be transmitted to network switch 7 from IP encoder 4 or imaging device 3 to IP decoder 5 then to first device (e.g., display) 6 or straight to first device 6 so the medical professional can view the footage from the endoscope in high quality and real time. The medical students are simply observing the procedure or the procedure may simply be stored in a storage medium and therefore do not require that the endoscope footage be in the highest quality. As such, imaging data from imaging device 3 can be transmitted to IP encoder 4 where a second video stream is generated based on the imaging data that has a bitrate lower than the bitrate of the first video stream. This compressed stream is transmitted to network switch 7 then to IP decoder 5 in IP network 2. The IP decoder 5 can decode/decompress the compressed video stream 2 for consumption by the second device 6 (e.g., display or remote storage medium) for display to the medical students or for storage on a storage medium, for example. As shown in FIG. 3A, network switch 7 is not in IP network 1 or 2. Instead, network switch 7 can be part of a public or a bigger private network such as an institutional or campus IP network that has a low bandwidth.

The following is one example of how the network diagram of FIG. 3B can function during a medical procedure. A medical professional can be performing an endoscopic procedure, for example, in an operating room that includes private IP network 1 (e.g., high bandwidth network). At the same time, a group of medical students may be observing the medical procedure or a recording of the medical procedure may be stored in a second room having its own IP network 2 (e.g., high bandwidth network). Because the medical professional needs to be able to see the endoscope video in high quality to be able to perform the procedure, the imaging data from the imaging device 3 may not be compressed or may be slightly compressed. This first video stream can be transmitted to network switch 7 from IP encoder 4 or imaging device 3 to IP decoder 5 then to first device (e.g., display) 6 or straight to first device 6 so the medical professional can view the footage from the endoscope in high quality and real time. The medical students are simply observing the procedure or the procedure may simply be stored in a storage medium and therefore do not require that the endoscope footage be in the highest quality. As such, imaging data from imaging device 3 can be transmitted to IP encoder 4 through network switch 7 to transcoder 10 where a second video stream is generated based on the imaging data that has a bitrate lower than the bitrate of the first video stream. The transcoder can act as a bridge or edge device between private network 1 and the institutional IP network. This compressed stream is transmitted to network switch 7 then to IP decoder 5 in IP network 2. The IP decoder 5 can decode/decompress the compressed video stream for consumption by the second device 6 (e.g., display or remote storage medium) for display to the medical students or for storage on a storage medium, for example. As shown in FIG. 3A, network switch 7 is not in IP network 1 or 2. Instead, network switch 7 can be part of a public or a bigger private network such as an institutional or campus IP network that has a low bandwidth. As explained above, the transcoder can act as a bridge between the private IP network and the public or bigger private IP network.

FIG. 4 is similar to FIG. 3A except that an IP network can include at least one IP camera 8. An IP camera can be a type of camera that receives control data and sends image data via an IP network. The at least one IP camera can be communicatively coupled to a network switch. The network switch can be a network switch in the same IP network as the at least one IP camera or in a different network as the at least one IP camera. Image data from the IP camera can be compressed or encoded. In some aspects, the image data from the IP camera can be compressed by an IP encoder. The IP camera can be communicatively coupled to network switch 7. The compressed stream from the IP camera can be transmitted to network switch 7 then to IP encoder 5 to device 6 (e.g., display device). Accordingly, the image data from the IP camera can be shared between two private, high bandwidth networks across a low bandwidth network (e.g., institutional or campus network). This network shown in FIGS. 3 and 4 can utilize IP encoders to simultaneously generate uncompressed and compressed streams while IP decoders can be able to consume both uncompressed and compressed streams. This ability can create interoperability between proprietary technologies and standards-based technologies, effectively creating a hybrid solution.

FIG. 5 is similar to FIG. 3A except that IP network 1 and IP network 2 have their own network switch 7 in the IP network. In addition, in some aspects, each IP network can have at least one imaging device (3a and 3b), at least one consuming device (6, 6a, and 6b), at least one IP encoder (4, 4a, and 4b), and/or at least one IP decoder (5, 5a, 5b). As shown in FIG. 5, a low bandwidth network (e.g., institution or campus IP network) can bridge at least two high bandwidth, private IP networks. The network switches in their respective networks can transmit compressed and/or uncompressed streams to IP decoder(s) within the same network or to different IP networks through a bridging network switch.

Figure 6:
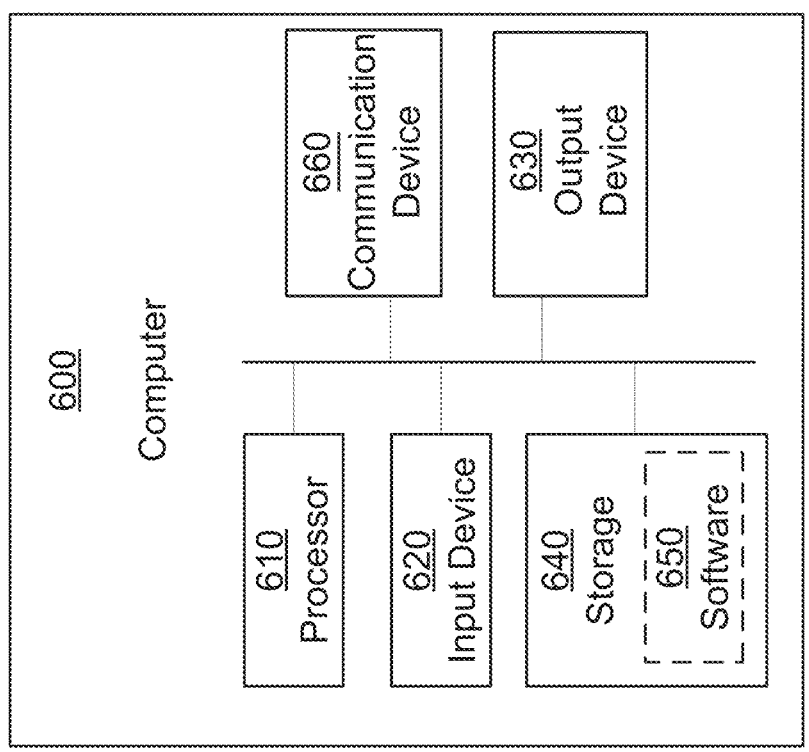
FIG. 6 depicts a computer, in accordance with some aspects.

FIG. 6 illustrates a computer, in accordance with some aspects. Computer 600 can be a component of a system for transmitting image data, such as system 100 and/or any of its subcomponents described above with respect to FIG. 1. In some aspects, computer 600 may be configured to execute a method for transmitting image data, such as all or part of method 200 described above with respect to FIG. 2.

Computer 600 can be a host computer connected to a network. Computer 600 can be a client computer or a server. As shown in FIG. 6, computer 600 can be any suitable type of microprocessor-based device, such as a personal computer; workstation; server; or handheld computing device, such as a phone or tablet. The computer can include, for example, one or more of processor 610, input device 620, output device 630, storage 640, and communication device 660.

Input device 620 can be any suitable device that provides input, such as a touch screen or monitor, keyboard, mouse, or voice-recognition device. Output device 630 can be any suitable device that provides output, such as a touch screen, monitor, printer, disk drive, or speaker.

Storage 640 can be any suitable device that provides storage, such as an electrical, magnetic, or optical memory, including a RAM, cache, hard drive, solid state drive, CD-ROM drive, tape drive, or removable storage disk. Communication device 660 can include any suitable device capable of transmitting and receiving signals over a network, such as a network interface chip or card. The components of the computer can be connected in any suitable manner, such as via a physical bus or wirelessly. Storage 640 can be a non-transitory computer-readable storage medium comprising one or more programs, which, when executed by one or more processors, such as processor 610, cause the one or more processors to execute methods described herein, such as all or part of method 200 described above with respect to FIG. 2.

Software 650, which can be stored in storage 640 and executed by processor 610, can include, for example, the programming that embodies the functionality of the present disclosure (e.g., as embodied in the systems, computers, servers, and/or devices as described above). In some aspects, software 650 can be implemented and executed on a combination of servers such as application servers and database servers.

Software 650 can also be stored and/or transported within any computer-readable storage medium for use by or in connection with an instruction execution system, apparatus, or device, such as those described above, that can fetch and execute instructions associated with the software from the instruction execution system, apparatus, or device. In the context of this disclosure, a computer-readable storage medium can be any medium, such as storage 640, that can contain or store programming for use by or in connection with an instruction execution system, apparatus, or device.

Software 650 can also be propagated within any transport medium for use by or in connection with an instruction execution system, apparatus, or device, such as those described above, that can fetch and execute instructions associated with the software from the instruction execution system, apparatus, or device. In the context of this disclosure, a transport medium can be any medium that can communicate, propagate, or transport programming for use by or in connection with an instruction execution system, apparatus, or device. The transport-readable medium can include, but is not limited to, an electronic, magnetic, optical, electromagnetic, or infrared wired or wireless propagation medium.

Computer 600 may be connected to a network, which can be any suitable type of interconnected communication system. The network can implement any suitable communications protocol and can be secured by any suitable security protocol. The network can comprise network links of any suitable arrangement that can implement the transmission and reception of network signals, such as Ethernet network connections, wireless network connections, T1 or T3 lines, cable networks, DSL, or telephone lines.

Computer 600 can implement any operating system suitable for operating on the network. Software 650 can be written in any suitable programming language, such as C, C++, C#, Java, or Python. In various aspects, application software embodying the functionality of the present disclosure can be deployed in different configurations, such as in a client/server arrangement or through a Web browser as a Web-based application or Web service, for example.

For the purpose of clarity and a concise description, features are described herein as part of the same or separate aspects; however, it will be appreciated that the scope of the disclosure includes aspects having combinations of all or some of the features described.

ADDITIONAL DEFINITIONS

Unless defined otherwise, all terms of art, notations and other technical and scientific terms or terminology used herein are intended to have the same meaning as is commonly understood by one of ordinary skill in the art to which the claimed subject matter pertains. In some cases, terms with commonly understood meanings are defined herein for clarity and/or for ready reference, and the inclusion of such definitions herein should not necessarily be construed to represent a substantial difference over what is generally understood in the art.

As used herein, the singular forms "a," "an," and "the" are intended to include the plural forms as well, unless the context clearly indicates otherwise. It is also to be understood that the term "and/or" as used herein refers to and encompasses any and all possible combinations of one or more of the associated listed items. It is further to be understood that the terms "includes," "including," "comprises," and/or "comprising," when used herein, specify the presence of stated features, integers, steps, operations, elements, components, and/or units but do not preclude the presence or addition of one or more other features, integers, steps, operations, elements, components, units, and/or groups thereof.

The above description is presented to enable a person skilled in the art to make and use the disclosure, and is provided in the context of a particular application and its requirements. Various modifications to the preferred aspects will be readily apparent to those skilled in the art, and the generic principles defined herein may be applied to other aspects and applications without departing from the spirit and scope of the disclosure. Thus, this disclosure is not intended to be limited to the aspects shown, but is to be accorded the widest scope consistent with the principles and features disclosed herein.

The invention claimed is:

1. A method of transmitting medical imaging data, the method comprising:
generating a first video stream based on medical imaging data generated by an imaging device in a first room in a healthcare environment, wherein the first video stream comprises a first bitrate;
generating a second video stream based on the medical imaging data, wherein the second video stream comprises a second bitrate lower than the first bitrate;
concurrently transmitting the first video stream and the second video stream from a first internet protocol network of the first room to a network switch, wherein the second video stream is compressed before transmission to the network switch;
transmitting the first video stream from the network switch to a first device on the first internet protocol network in the first room of the healthcare environment;
transmitting the second video stream from the network switch to a second internet protocol network; and
transmitting the second video stream from the second internet protocol network to a third internet protocol network of a second room in the healthcare environment for consumption by a second device, wherein the second video stream is decompressed before consumption by the second device.

2. The method of claim 1, wherein generating the second video stream comprises encoding the medical imaging data for transmission over an internet protocol network.

3. The method of claim 1, comprising receiving the medical imaging data at an encoding device, wherein the encoding device generates and concurrently transmits the first video stream and the second video stream.

4. The method of claim 1, wherein the imaging device is configured to generate the first video stream and the second video stream.

5. The method of claim 1, wherein the first video stream is generated by the imaging device and the second video stream is generated by an encoding device.

6. The method of claim 5, wherein the encoding device receives the first video stream and generates the second video stream based on the first video stream.

7. The method of claim 1, wherein the first and second video streams are concurrently transmitted to a network switch.

8. The method of claim 1, wherein the first and second video streams are concurrently transmitted over the same transmission line.

9. The method of claim 1, wherein the first video stream is generated by the imaging device and the second video stream is generated by a transcoder or the first video stream is generated by an encoding device and the second video stream is generated by a transcoder.

10. The method of claim 9, wherein the transcoder receives the first video stream and generates the second video stream based on the first video stream.

11. The method of claim 9, wherein the first video stream is transmitted to a network switch and then to the transcoder.

12. The method of claim 1, wherein the first device comprises a first display and the second device comprises a second display.

13. The method of claim 1, wherein the first device and second device are configured to consume the first and/or second video stream.

14. The method of claim 1, wherein the second device comprises a remote storage medium.

15. The method of claim 1, wherein the imaging data comprises endoscopic imaging data.

16. The method of claim 1, wherein the imaging data is generated during a medical procedure and the first and second video streams are transmitted during the medical procedure.

17. The method of claim 1, wherein the first video stream comprises non-image data.

18. The method of claim 17, wherein the non-image data comprises at least one of sensor data, overlays, user input and control signals, or audio data.

19. The method of claim 1, wherein the second bitrate is at most 100 megabits per second.

20. The method of claim 1, wherein the first bitrate is at least 1 gigabit per second.

21. The method of claim 1, further comprising:
receiving the first video stream at a decoding device and transmitting the first video stream from the decoding device to the first device;
receiving a third video stream at the decoding device, wherein the third video stream comprises a third bitrate lower than the first bitrate; and
transmitting the third video stream for consumption by the first device.

22. A system for transmitting medical imaging data, the system comprising:
one or more processors, wherein the one or more processors are configured to:
generate a first video stream based on medical imaging data generated by an imaging device in a first room in a healthcare environment, wherein the first video stream comprises a first bitrate;
generate a second video stream based on the medical imaging data, wherein the second video stream comprises a second bitrate lower than the first bitrate;
concurrently transmit the first video stream and the second video stream from a first internet protocol network of the first room to a network switch, wherein the second video stream is compressed before transmission to the network switch;
transmitting the first video stream from the network switch to a first device on the first internet protocol network in the first room of the healthcare environment;
transmitting the second video stream from the network switch to a second internet protocol network; and
transmitting the second video stream from the second internet protocol network to a third internet protocol network of a second room in the healthcare environment for consumption by a second device, wherein the second video stream is decompressed before consumption by the second device.

23. A non-transitory computer-readable storage medium storing instructions configured to be executed by one or more processors of a system for transmitting medical imaging data, wherein executing the instructions causes the system to:
generate a first video stream based on medical imaging data generated by an imaging device in a first room in a healthcare environment, wherein the first video stream comprises a first bitrate;
generate a second video stream based on the medical imaging data, wherein the second video stream comprises a second bitrate lower than the first bitrate;
concurrently transmit the first video stream and the second video stream from a first internet protocol network of the first room to a network switch, wherein the second video stream is compressed before transmission to the network switch;
transmitting the first video stream from the network switch to a first device on the first internet protocol network in the first room of the healthcare environment;
transmitting the second video stream from the network switch to a second internet protocol network; and
transmitting the second video stream from the second internet protocol network to a third internet protocol network of a second room in the healthcare environment for consumption by a second device, wherein the second video stream is decompressed before consumption by the second device.

24. The method of claim 1, wherein the first, second, or third internet protocol network is a virtualized network.

25. The method of claim 1, wherein the first, second, and third internet protocol networks are virtualized networks.

26. The method of claim 1, wherein transmitting the second video stream from the network switch to a second internet protocol network comprises transmitting the second video stream from the network switch to a second network switch in the second internet protocol network.

27. The method of claim 26, wherein transmitting the second video stream to a third internet protocol network comprises transmitting the second video stream from the second network switch to a third network switch in the third internet protocol network.

28. A method of transmitting medical imaging data, the method comprising:
generating a first video stream based on medical imaging data generated by an imaging device in a first room in a healthcare environment, wherein the first video stream comprises a first bitrate;
generating a second video stream based on the medical imaging data, wherein the second video stream comprises a second bitrate lower than the first bitrate;
transmitting the first video stream and the second video stream within a first network;
transmitting the first video stream for consumption by a first device on the first network in the first room of the healthcare environment;
transmitting the second video stream to a second network; and transmitting the second video stream from the second network to a third network of a second room in the healthcare environment for consumption by a second device.

\* \* \* \* \*